United States Patent
Bransby

(10) Patent No.: US 11,768,074 B2
(45) Date of Patent: Sep. 26, 2023

(54) POSITIONING SYSTEM AND METHOD

(71) Applicant: THE CORPORATION OF TRINITY HOUSE OF DEPTFORD STROND, London (GB)

(72) Inventor: Martin Bransby, Harwich (GB)

(73) Assignee: THE CORPORATION OF TRINITY HOUSE OF DEPTFORD STROND, London (GB)

( * ) Notice: Subject to any disclaimer, the term of this patent is extended or adjusted under 35 U.S.C. 154(b) by 102 days.

(21) Appl. No.: 17/056,913

(22) PCT Filed: May 23, 2019

(86) PCT No.: PCT/GB2019/051428
§ 371 (c)(1),
(2) Date: Nov. 19, 2020

(87) PCT Pub. No.: WO2019/224549
PCT Pub. Date: Nov. 28, 2019

(65) Prior Publication Data
US 2021/0215487 A1 Jul. 15, 2021

(30) Foreign Application Priority Data
May 23, 2018 (GB) ..................................... 1808480

(51) Int. Cl.
*B63B 49/00* (2006.01)
*G01C 21/20* (2006.01)
(Continued)

(52) U.S. Cl.
CPC ............ *G01C 21/203* (2013.01); *B63B 49/00* (2013.01); *G01C 13/002* (2013.01); *G02B 23/18* (2013.01); *G01C 21/005* (2013.01); *G01C 21/22* (2013.01)

(58) Field of Classification Search
CPC .... G01C 21/203; G01C 21/205; G01C 21/22; G01C 13/002; G01C 21/005; B63B 49/00; G02B 23/18
(Continued)

(56) References Cited

U.S. PATENT DOCUMENTS 4,513,378 A * 4/1985 Antkowiak ............ G01C 21/22
701/493
6,181,302 B1 1/2001 Lynde
(Continued)

FOREIGN PATENT DOCUMENTS

AU 2019273765 A1 * 12/2020 ............. B63B 49/00
CA 3101389 A1 * 11/2019 ............. B63B 49/00
(Continued)

OTHER PUBLICATIONS

"How effective can GSM signals, using DCM, be as an aid to coastal navigation?" C Brewer—2009—https://pearl.plymouth.ac.uk; The Plymouth Student Scientist—vol. 2, No. 2—2009 (Year: 2009).*
(Continued)

*Primary Examiner* — Cuong H Nguyen
(74) *Attorney, Agent, or Firm* — Renner, Kenner Greive, Bobak Taylor & Weber

(57) ABSTRACT

This invention relates to a positioning system and a method for navigation, in particular but not exclusively to a positioning system and a method for maritime navigation. A positioning system and method for navigation comprising a reference unit positioned on a vehicle, and a portable optical device, in communication with the reference unit, comprising sensing means to measure bearings to observed target points relative to the vehicle heading to thereby determine a position of the vehicle.

18 Claims, 7 Drawing Sheets

(51) Int. Cl.
*G01C 13/00* (2006.01)
*G02B 23/18* (2006.01)
*G01C 21/22* (2006.01)
*G01C 21/00* (2006.01)

(58) Field of Classification Search
USPC .......................................................... 701/21
See application file for complete search history.

(56) References Cited

U.S. PATENT DOCUMENTS

| | | | | |
|---|---|---|---|---|
| 6,202,535 | B1 | 3/2001 | Alhadef et al. | |
| 6,717,525 | B1* | 4/2004 | Evanoff | B63B 45/04 |
| | | | | 340/815.65 |
| 10,261,176 | B2* | 4/2019 | Johnson | G01S 7/20 |
| 10,942,027 | B2* | 3/2021 | Johnson | H04N 23/6812 |
| 10,942,028 | B2* | 3/2021 | Johnson | G06T 3/40 |
| 2017/0176586 | A1* | 6/2017 | Johnson | G01C 17/38 |
| 2018/0259339 | A1* | 9/2018 | Johnson | G06T 3/60 |
| 2019/0360810 | A1* | 11/2019 | Johnson | G01S 15/87 |
| 2020/0018848 | A1* | 1/2020 | Rivers | G01S 13/867 |
| 2021/0215487 | A1* | 7/2021 | Bransby | B63B 49/00 |

FOREIGN PATENT DOCUMENTS

| | | | | |
|---|---|---|---|---|
| DE | 4312310 A1 | 3/1995 | | |
| GB | 2574375 A | * 12/2019 | | B63B 49/00 |
| JP | H0594709 U | 12/1993 | | |
| WO | WO-2018183777 A1 | * 10/2018 | | B60L 15/34 |
| WO | WO-2019224549 A1 | * 11/2019 | | B63B 49/00 |

OTHER PUBLICATIONS

Bransby, Martin, "BinoNav®—A New Positioning System for Maritime," Proceedings of the 31st International Technical Meeting of the Satellite Division of The Institute of Navigation (Ion GNSS+ 2018), Miami, Florida, Sep. 2018, pp. 1728-1735. https://doi.org/10.33012/2018.15941 (Year: 2018).*

J. L. Hammer and W. R. Hole, "Continuing need for accurate positioning in naval tactics," Oceans '88. 'A Partnership of Marine Interests'. Proceedings, 1988, pp. 1379-1383, doi: 10.1109/OCEANS. 1988.23720 (Year: 1988).*

\* cited by examiner

POSITIONING SYSTEM AND METHOD

This invention relates to a positioning system and a method for navigation, in particular but not exclusively to a positioning system and a method for maritime navigation.

BACKGROUND OF THE INVENTION

Nowadays, many critical instruments rely on Global Navigation Satellite Systems (GNSS). GNSS provide autonomous geo-spatial positioning and timing information with global coverage through extensive electronic navigational and communication technologies, including the Global Positioning System (GPS).

However, GNSS are vulnerable to disruptions, interference and, in the worst-case scenario, failure. In the latter case, the consequences could be disastrous.

An aim of this invention is therefore to provide a reliable and resilient positioning system that could function in case GNSS are not operating.

In maritime navigation there are systems that are not satellite-based systems as such. Terrestrial systems can, in fact, provide valuable Position Navigation and Timing (PNT) information alongside GNSS and other regional systems to improve safety at sea.

An example of ground-equipment used in the maritime navigation is a reference instrument for measuring relative bearings of observed objects, namely a pelorus. Conversely to a compass, a pelorus has no directive properties and remains at any relative direction to which it is set. Generally, it is used by setting zero degree at the lubber's line (the line pointing towards the front of the vehicle—conventionally, the direction of movement—and corresponding to the vehicle's centreline). Relative bearings are then typically observed through vanes suitably mounted on the instrument. They can be converted, for example, to true or magnetic bearings, by adding the appropriate heading.

However, a problem with the pelorus is that its manual use can introduce errors for example due to misalignments. Other errors, including parallax can be introduced when sighting to the observed object through the vanes.

Further, a pelorus is fixedly positioned on a vessel and therefore is not portable. This is a limitation as in substantially large vehicles more than one pelorus may be required. For example, two pelorus are typically installed in a large ship, preferably one each mounted at the port and starboard of the ship.

Moreover, a pelorus is a standalone instrument and therefore cannot be integrated with other on-board systems. It also requires conventional paper navigation charts to determine the position of a vehicle. The process of manually drawing relative bearings on a paper whilst also considering the true or magnetic compass deviations when determining the relative bearings may be not efficient and may introduce additional errors.

An aim of the present invention is therefore to provide a ground-based positioning system/method for navigation that serves at least to address some of the above problems.

STATEMENT OF THE INVENTION

The present invention provides a positioning system/equipment for navigation comprising:
a reference unit positioned on/in a vehicle, and
a portable optical device, in communication with the reference unit, comprising sensing means to measure bearings to observed target points relative to the vehicle heading to thereby determine a position of the vehicle.

The present invention may comprise more than one optical device.

The system may be configured to also determine important PNT data including velocity, course, or rate of turn of the vehicle without relying on a satellite-based system. The system may be useful, for example, in determining the moment at which a target point is broad on the beam or in measuring pairs of relative bearings which can be used to determine distance off and distance abeam of a target point.

The positioning system may further comprise:
processing means to calculate the position of the vehicle on an electronic navigation chart; and/or
displaying means to show the position of the vehicle on the electronic navigation chart.

The system may comprise a microprocessor to derive the bearings taken by the optical device relative to the vehicle heading. The reference unit and/or the optical device may comprise the microprocessor.

The displaying means may be arranged in, or linked with, the reference unit and/or in the optical device, and/or can be part of a separate computer or mobile device, which may include any portable computing device such as a smartphone or tablet computer.

The displaying means are preferably in communication with the reference unit by transmitting links/means. In an embodiment of this invention, the reference unit is physically connected to a computer device, but other linking means may be used.

The reference unit may be connected to a vehicle compass and/or to an Electronic Chart Display and Information System (ECDIS), preferably by standard interfacing protocols such as NMEA-0183 and RS-232.

The bearings may be automatically displayed on the electronic navigation chart, preferably with lines indicating lines of sight between an observer using the optical device (preferably in/on the vehicle) and the target point.

The bearings may be logged automatically. The system of the present invention enables the bearings computed from the sightings to be automatically logged. As part of a paperless chart system, regular bearings are taken using the radar plan position indicator and these are transferred to a log which may be inspected from time-to-time for compliance. This could advantageously, supplement or supplant the radar-derived log whilst also allowing a faster and easier log process for compliance. Moreover, this also allows identifying landmarks to be included in the log of fixes.

The position of the vehicle may be determined by obtaining at least three bearings, preferably using a "cocked-hat" method.

The reference unit is fixedly aligned to the vehicle heading to calculate relative bearings appropriately. The reference unit is a separate unit, namely 'base' unit, which is fixed to the vehicle heading, such that it shall not be dislodged if the vehicle is subject to excessive motion and/or acceleration. The reference unit may be integrated with the on-board instrumental system of the vehicle.

The optical device may be configured to be detachably connected to, or arranged in/on, the reference unit.

The optical device is a roaming unit which is in communication with the reference unit by transmitting means, preferably by a radio link. Other suitable transmitting/linking means including, for example, wireless or physical (wiring) links may be used.

The optical device is preferably a pair of binoculars. Nevertheless, other types of optical devices may be used.

Binoculars may be used during darkness or limited visual conditions. Other optical devices such as rangefinder cameras may be also used. It will be appreciated that these devices enable bearing measurement and positioning data to be taken directly and efficiently. Rangefinder devices which measure distances from an observatory target use different methods/techniques such as laser, radar, and ultrasonic range finding methods. Other optical devices measuring distances using trigonometry or other methodologies may also be used. Other special ranging method may employ actively synchronised transmissions and travel time measurements.

The reference unit may comprise a sensing means that is configured to cooperate with the sensing means of the optical device to prevent drift problems. The sensing means may be synchronised when the reference unit is connected to the optical device. The sensing means may be an inertial sensor, preferably a gyroscope. Other sensors or combination of sensors may be available.

The reference unit may comprise displaying means, preferably a liquid-crystal display, to show at least the bearings and other relevant information such as positioning, navigation, and timing information.

The system may be configured to determine and track several positions of the vehicle to thereby determining a course of the vehicle.

The reference unit may further comprise a touch interface, preferably having touch means, for selecting different functionalities/methods. The system may be designed to operate on a 'radar/live' mode by which instantaneous bearings are indicated in real-time.

The reference unit may have a programming port being fitted on the reference unit for software updates.

The reference unit may be powered by a power supply unit in the vehicle, preferably the vehicle battery or electrical system.

The present invention also provides a method of taking a bearing of a visually observed target point relative to a vehicle heading, the method comprising:
  providing a system as described above;
  lining up the target point with the portable optical device;
  taking the bearing through a human-machine interface;
  automatically processing and displaying the bearing on an electronic navigation chart; and
  determining the position of the vehicle, preferably by using a 'cocked-hat' method.

The human-machine interface may be pressing a button switch. The term may include visual or acoustic, and/or multisensory interactions.

The method may further comprise taking more than one bearing, preferably at least three bearings.

The method may further comprise determining and tracking additional information, such as course, speed, distance of the vehicle. This information may be indicated on display means, preferably indicated on an electronic navigation chart.

One of the aims of this invention is to increase safety whilst raising general awareness that it is vital to look outside a window of a vehicle for visual navigational aids, other vehicles and other navigational features.

It will be appreciated that the present system/method provides the possibility of transmitting or broadcasting remotely the reference of the vehicle heading to the optical device at least without necessarily needing a reference (base) unit upon which the optical device is detachably connected/arranged. The combination of a roaming and reference unit allows greater portability and efficiency compared at least to conventional equipment. For example, the provision of a portable optical device allows several measurements to be taken at different locations of the vehicle without requiring more than one to be installed on the vehicle. This may be particularly beneficial, for instance, on a large vehicle such as a ship. Errors due to incorrect manual setting or sighting typically related to conventional pelorus can be also avoided. This also includes errors in drawing the measured bearing into paper navigation charts to determine a position of the vehicle.

A skilled person will readily appreciate that the number of advantages provided by the present invention are many. For example, the system/method operates without the need of a global navigation satellite system (GNSS) such as the global positioning system (GPS), and it will be a relatively simple to make and use. A position of the vehicle can be determined automatically and more efficiently (and in an eco-friendly approach). Different measurements can be taken in real-time during navigation and the position of the vessel can be displayed and tracked on the navigation chart at any desired time. Having the capability of drawing bearings on an electronic navigation chart allows convenient editing if needed. It also allows cross reference to other navigational data.

The system/method is designed to provide an easy to use back-up and as a confirmation of a vessel's position by means of identifiable geographical marks on sea or on land. Instead of remembering bearings taken from a pelorus, considering a magnetic variation, and manually plotting the derived bearings to a chart, this system allows all these steps to be done in an automatic and efficient way, and without the use of paper.

The positioning system of this invention is based on visual navigation and does not rely on GNSS. It is ground-based rather than satellite-based and is therefore primarily designed to be used for example in the event of a GPS outage for whatever reason. The present invention provides an improvement over a pelorus, with enhanced portability and automatization whilst providing real or near-real time capabilities. The system does allow connectivity and potentially (full) integration with on board equipment and systems (e.g. ECDIS).

It will improve the general awareness that visual system not reliant upon global navigation systems are needed and that resilient PNT systems are of course desirable to provide a record for regulations matters.

Plotting lines of relative bearings to landmarks or other vessels are important because they create a notable record of human interventions which is also required by regulations.

It will also be appreciated that this fall-back system will be very beneficial if the transmitted bearing can be stored and transmitted to locate vessels and vessels in situations of need for example during search and rescue operations.

The optical device unit is portable, and this is a significant advantage over conventional fixed equipment and satellite-based systems because a user of this system can take the optical device at any desired point within the vehicle and, by merely pressing a button, the relative bearing will be indicated automatically on an electronic navigation chart. A position of the vehicle can be determined by repeating this measurement at least two times. So, it will be appreciated that such a visual-based system is easy to use, and its portability and almost real-time automatic displaying functionalities constitute a valuable fall-back system if necessary.

DEFINITIONS OF SOME TERMS

The term 'vehicle' includes any means for transporting people or goods on land, air, or sea. The vehicle/craft is preferably but not exclusively related to a vessel.

Target points are physical objects or landmarks, including navigational aids such as lighthouses, buoys, or day beacons, etc.

The vehicle's heading is preferably the direction that the vehicle's nose/bow is pointing, assuming the vehicle moves forward (being the customary direction of movement). The vehicle's heading is aligned with the vehicle's centreline which represents zero degrees and is therefore the zero-point from which relative bearings are measured.

A bearing can be defined as the direction in which a target point lies. A relative bearing of an object is the angle at the observer between the vehicle's heading and the line of sight to the object from the vehicle.

Relative bearings can be converted to true or magnetic bearings etc., by adding the appropriate heading. If the true heading is set at the lubber's line, true bearings are observed directly. Similarly, compass bearings can be observed if the compass heading is set at the lubber's line, etc. However, the vessel must be on the vehicle heading to which the reference unit is set if accurate results are to be obtained, or else a correction must be applied to the observed results.

The term 'course' defines a route of the vehicle from one point to another point.

An Electronic Chart Display and Information System (ECDIS) is a geographic information system used for nautical navigation that complies with International Maritime Organization (IMO) regulations as an alternative to paper nautical charts.

An ENC is an official database created by a national hydrographic office for use with an Electronic Chart Display and Information System (ECDIS).

BRIEF SUMMARY OF THE DRAWINGS

Embodiments of the present invention will now be described by way of example only with reference to the accompanying drawings, in which.

DETAILED DESCRIPTION OF THE DRAWINGS

Figure 1:
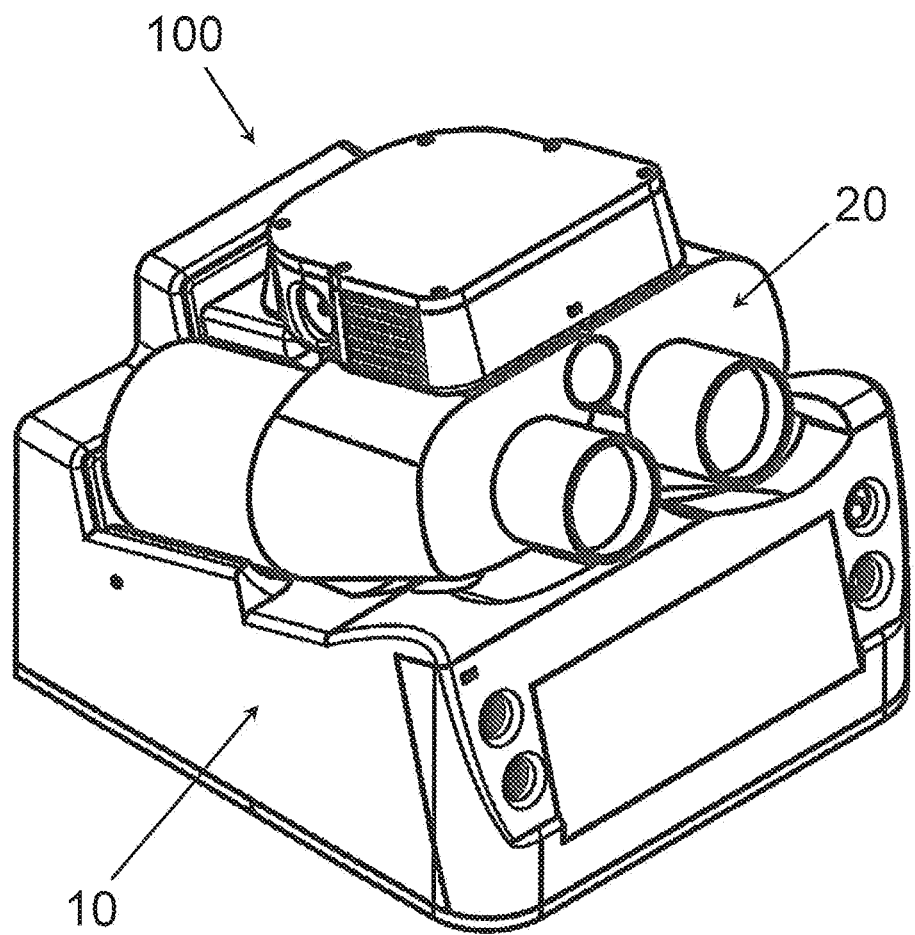
FIG. 1 is a perspective view of an embodiment of a positioning system/device in an assembled configuration according to the present invention.

FIG. 1 shows a perspective view of the system/device 100 in an assembled configuration according to the present invention. The positioning system comprises a reference unit 10, which is positioned at a suitable place on a vehicle. The reference unit can be also be a base unit as, in this embodiment, it represents the base upon which an optical device 20 is arranged. The optical device in this embodiment is a binocular unit. Advantageously, any conventional optical device can be adapted for use with appropriate modifications.

Figure 2:
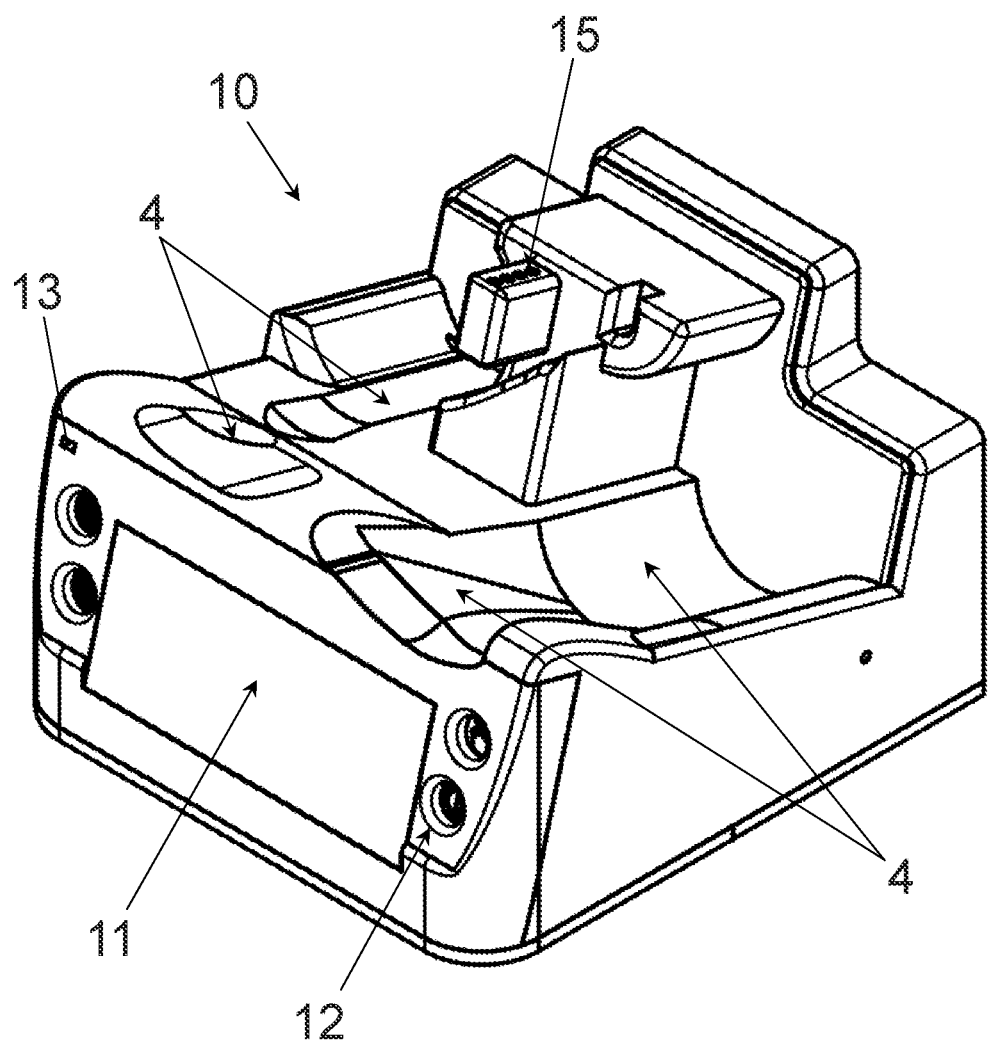
FIG. 2 is a perspective view of an embodiment of a reference unit of the positioning system/device according to the present invention.

FIG. 2 shows the reference unit 10 alone. The reference unit is fixedly oriented to the vehicle heading such that relative bearings are suitably calculated, and it shall not be dislodged in case the vehicle is subject to excessive motion and acceleration. Suitable fixing means, such as fasteners (not shown in the drawings), can be used to fix the reference unit to the vehicle.

The reference unit is designed such that the binoculars/binocular unit can be detachably arranged onto the reference unit and connected thereon through connector means 15 for recharging and synchronizing. The reference unit is shaped to enable the binocular unit to rest suitably on the reference unit, when 'on-hook' (see curved faces 4).

The reference unit 10 comprises display means, preferably but not exclusively, a Liquid-Crystal Display (LCD) 11 on which bearing measurements and other relevant information may be displayed. The reference unit 10 also comprises a touch sensor system connected to touch pads 12 (four in this embodiment), for controlling several functionalities of the system. For example, by pressing an appropriate touch pad, a "radar/live" mode option can be selected or deselected. Other options may also be available, including, for example, options that enable a user to take measurements or change the display options including brightness level. The reference unit has also a light-emitting diode (LEI)) 13 to indicate if the optical device is properly connected, and the status of the battery.

Figure 3:
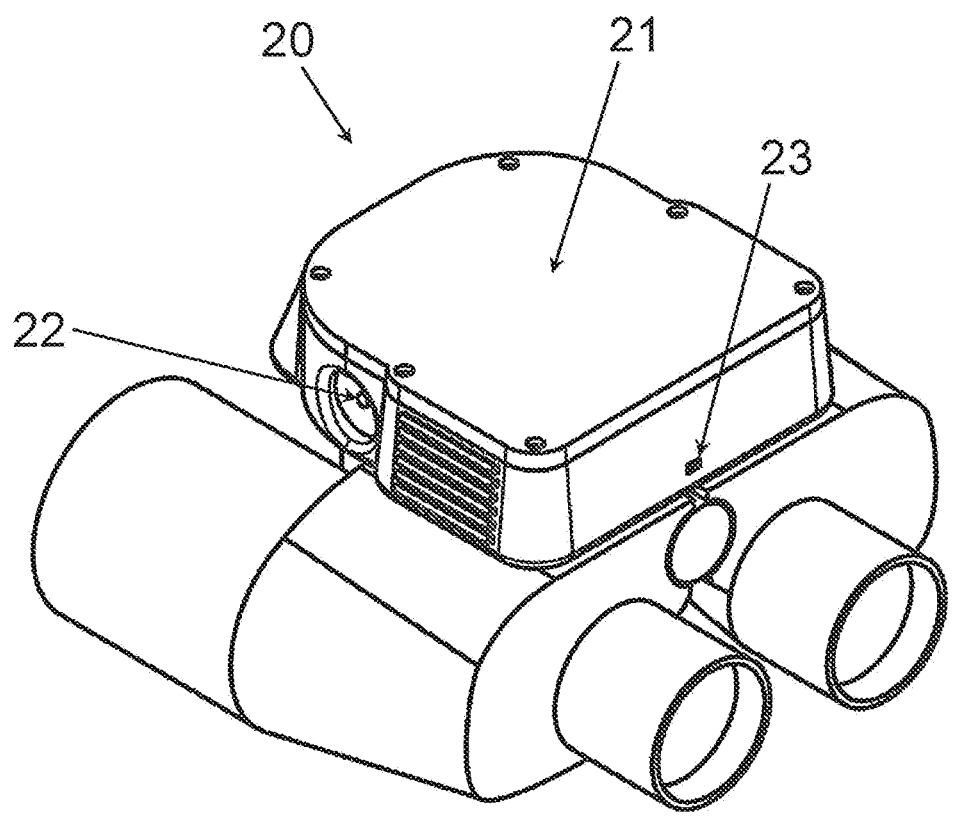
FIG. 3 is a perspective view of an embodiment of an optical device of the positioning system according to the present invention.

FIG. 3 shows an optical device 20 comprising a binocular unit. The binocular comprises a body 21 being substantially tapered cuboid in shape with rounded edges and corners. The body is configured on the binoculars such that the bottom wall of the body is adjacent to a top portion of the binoculars. The body 21 also comprises a sighting push button switch 22 to be pressed for taking a relative bearing to a target point being observed via the binoculars. Preferably there are two button switches 22, each positioned on a sidewall of the body and encircled as shown in FIGS. 1 and 3 to at least partially accommodate the tip of a finger therein. Conveniently, this allows both left- and right-handed users to take a measurement by pressing the button with an appropriate finger, as well as enables a finger to be guided to press the button unsighted (as a user will be watching through the binoculars). The body 21 also comprises connectors 25 (not shown in FIGS. 1 to 3) to the reference unit for synchronisation and recharging purposes (as explained below). A LED 23 and/or sound can visually and/or audibly confirm that the bearing has been taken. Of course, the system/device 100 may have other means for inputting bearings using a human-machine interface (HMI) other than tactile and visual; for example, allowing visual, acoustic, or multisensory interactions. Equally, there may be other means for receiving one or more feedback (e.g. audio, visual and/or tactile) confirming that the system has derived and recorded the relative bearing and display it on an electronic chart display. There are conditions such as the power being depleted or an obstruction to the radio link from the portable optical device to the reference unit where the information is not passed successfully. In those circumstances, a confirmation sound (e.g. a beep) acknowledging the sighting would therefore be useful. As a requirement, a confirmation sound is heard from the portable optical device if an Electronic Range Line EBL (bearing electronic line) is successfully passed into the Electronic Chart System (ECS).

The reference unit 10 and/or the body 21 may be formed of a (e.g. injection) moulded or 3D printed material.

Figure 4:
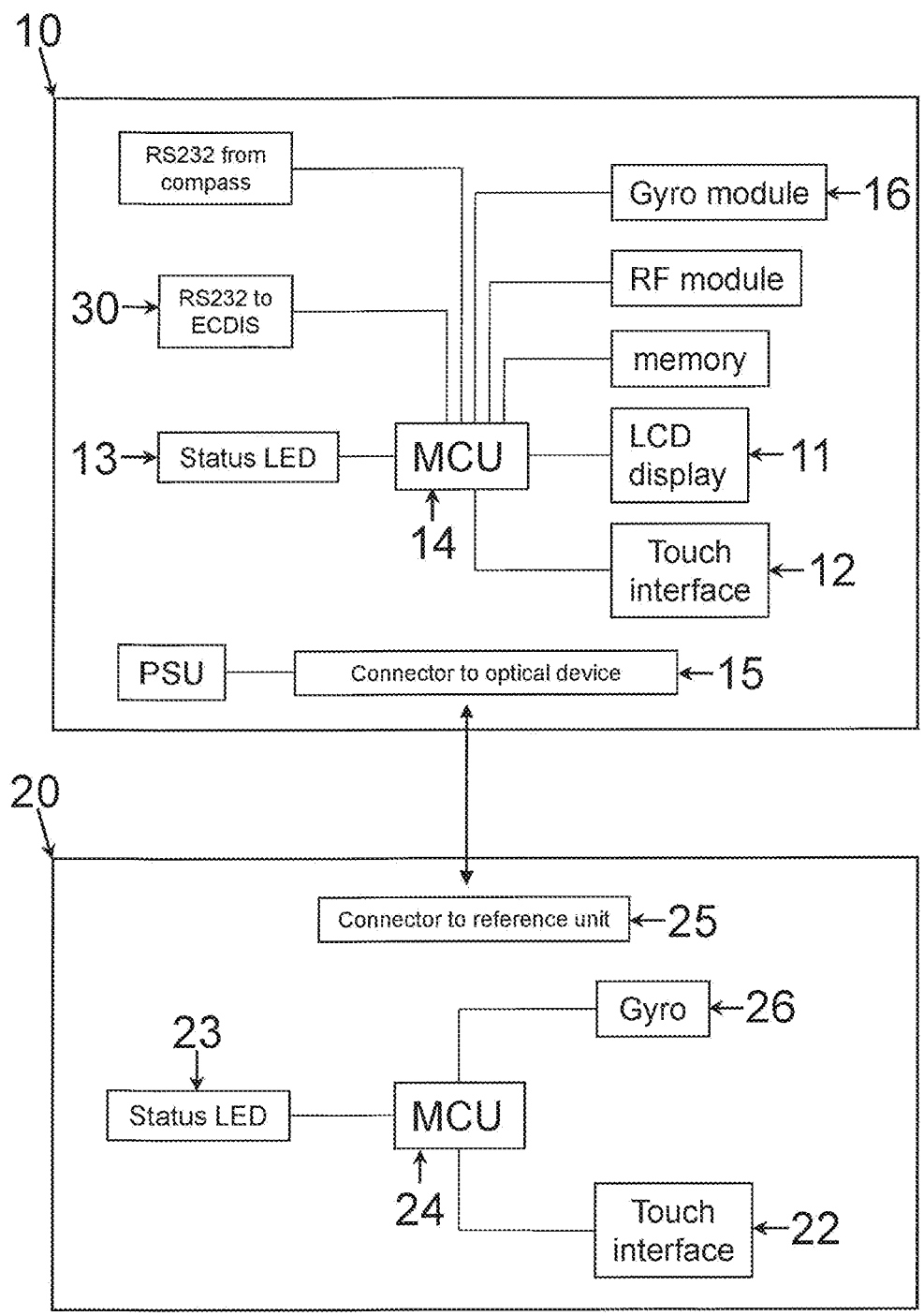
FIG. 4 is a block diagram representing the components of the reference unit and the optical device in an embodiment of the present invention.

FIG. 4 is a block diagram representing the components of the reference unit and the optical device in an embodiment of the present invention.

The body 21 of the optical device comprises a first gyroscope 26, which cooperates with a second gyroscope module 16 (located in the reference unit) to determine relative bearings. When the optical device is connected to the base unit ('on-hook') the gyroscopes synchronise to each other to avoid drift issues, hence improving accuracy of the measurements. The gyroscope module 16, which is a three-axis MEMS motion processing gyro, is a complete three-axis angular rate measuring system. This module, which is commercially available, is suitable for motion detection and location detection, particularly is a full-featured 3D Attitude and Heading Reference System (AHRS), Vertical Reference Unit (VRU) and Inertial Measurement Unit (IMU). It is appreciated that any combination of inertial measurement sensors including but not limited to gyroscope and accelerometer are encompassed in this invention.

The reference unit 10 circuit board comprises a microcontroller unit (MCU) 14, which is configured to process the radio signal received via an RF module. Of course, the optical device and the reference unit may communicate via wireless or by a physical link/wire even though the latter option would be less than ideal due to constraints on the portability of the system.

The microcontroller unit contains one or more CPUs (processor cores) along with memory and programmable input/output peripherals. The LCD display 11 and touch interface 12 are also connected to the MCU 14. The optical device has also an MCU 24 to derive the bearings taken.

The system is easy to install with a few connections for power supply unit (PSU) and National Marine Electronics Association (NMEA) compatible interfaces. The reference unit may use standard interfacing protocols inter alia NMEA-0183 and RS-232 to connect to the compass of the vehicle and to ECDIS.

The optical device (e.g., binocular unit) can be used detachably from the reference unit for some time before it needs recharging by the PSU through connectors 15 and 25 (FIGS. 2 and 4). When the binocular unit is placed 'on-hook' the units are connected. While 'on-hook' the optical device is recharging whilst also allowing the gyroscope of the reference unit to sync with the gyroscope on the binocular unit to prevent drifting problems. Ideally, recharging takes as short time as possible to fully restore the battery of the optical device. While 'on-hook' the system is also configured to clear the mode currently set and any line displayed on the chart.

Means of backup may also be provided for example in the event of GNSS jamming, a secondary, or isolated time reference. A battery-backed hardware time reference with stability of better than 1 second per day (typically a few seconds per week) would be then required. Also, the system would also be automatically set to GNSS-based time at initialisation (i.e. when switched on) and connected to the electronic charting system when running.

An alert is raised (preferably on the electronic charting system) if a large discrepancy (e.g. more than 5 seconds) is detected. Clearly, this is not going to have the same stability as GNSS, but small corrections can be made automatically once a day. If any large discrepancies occur, these are brought to the attention of the crew which might either indicate a problem with the present system or could be with the GNSS-derived time signal, which might indicate some malicious manipulation of the signal is underway.

Information will be processed by the MCU 14 and displayed on an electronic navigation chart (ENC) by means of a personal computer linked to the reference unit. The charting application that has been used is open CPM software, which has a reasonable reputation as reliable charting and planning however different applications may be of course considered. Other displaying means can be of course used to display this information. However, the bearings taken may be visually displayed on the LCD 11 of the reference unit. These data may be also and/or alternatively outputted in different ways; for example, as an audio form, etc. A user may then conventionally consider these measurements and draw physical lines on a paper navigational chart without the need of an electronic navigation chart.

A programming port/interface can be fitted to the rear panel of the reference unit for software updates. A separate programming unit can be plugged in the programming port, and a simple button-push allows updated firmware to be uploaded in the reference unit. The programming unit can be conveniently used by maintenance personnel to update firmware or apply settings which should not be available during normal operation, including apply corrections to fix drifting problems.

Figure 5:
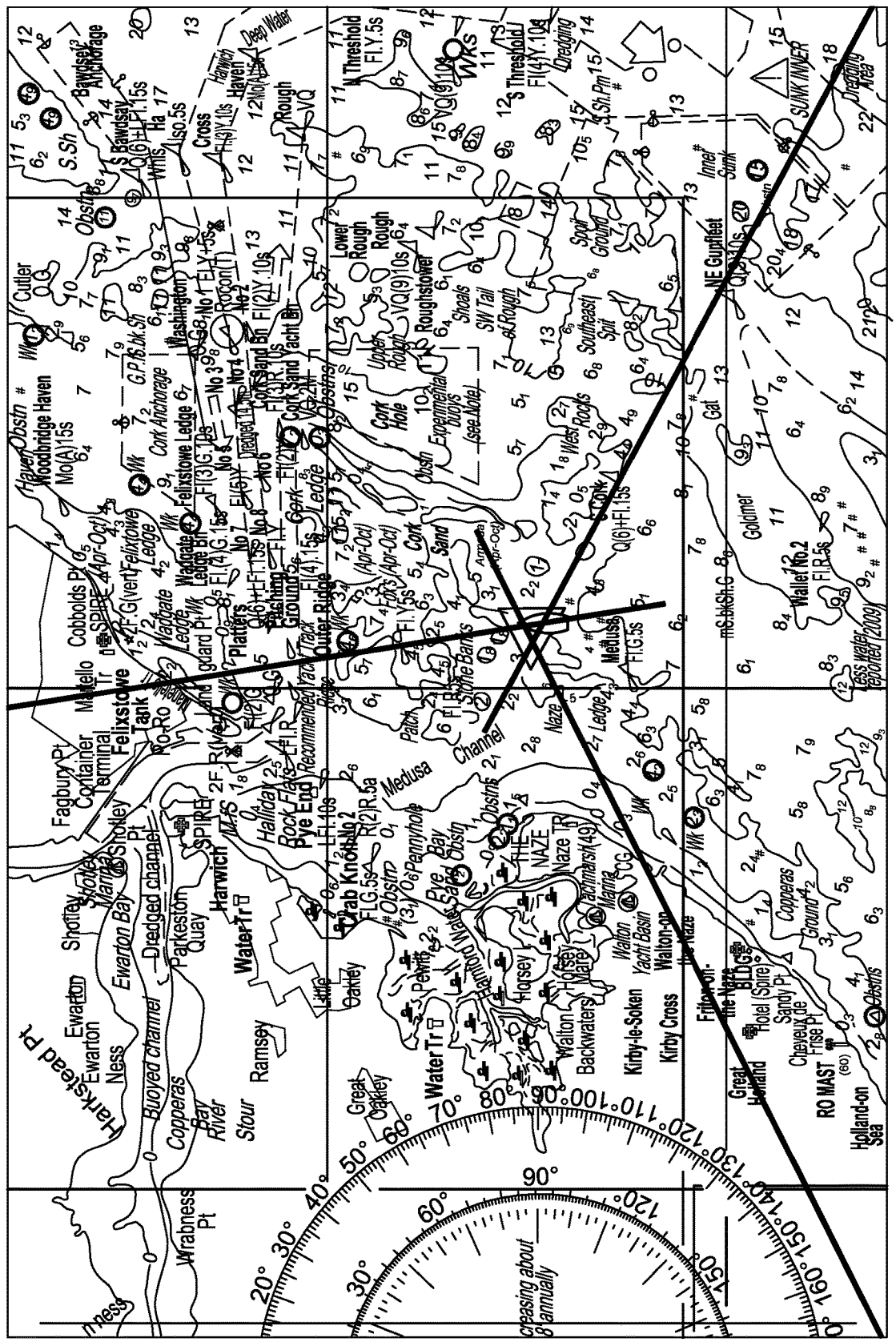
FIG. 5 is a representation of an electronic navigation chart in which a position of a vehicle (in this case a vessel) is determined by the "cocked-hat" method in accordance with an embodiment of the present invention.

FIG. 5 is a representation of an ENC in which a position of a vehicle (a vessel in this embodiment) is determined by the "cocked-hat" method. Notably, the present invention allows tracking on an ENC that is not from an EPFS. To obtain the position of the vessel as illustrated in FIG. 5, it is necessary to perform the following steps: (i) picking up the optical device 20; (ii) line up with a charted and known target point; and (iii) press either of the buttons 22. The system will then display automatically a line on an ENC relative to vessel's heading. It is necessary to repeat the above steps to obtain two more bearing measurements to determine a cocked-hat position of the vessel. Finally, it is also necessary hovering over the cocked hat and dropping a marker (e.g., triangle) thereon. In the navigation chart where many waypoints or viewpoints are placed these are relative to the position identified by the bearings those viewpoints can be visualised in the chart without having the line bearings for clarity so that the course of the vessel would be easily identifiable.

The electronic navigation chart ENC should be displaying the sighting lines a user takes. If necessary, these lines can be dragged to go through an intending target and when they are all in position, a right point can be dropped on the chart in a fixed position for future reference. Alternatively, the bearing lines can simply be deleted, and a new bearing can be taken to substitute those. When a target is sighted with the optical device 20 and a button 22 is pressed, the bearing is sent to the ECDIS and the charting application displays the sighting line. As more targets are observed the ECDIS displays those sighting lines in different colours for clarity. Of course, should one of those lines not pass through the intending land mark identified in the chart, a user can manually shift said line in order to position it through exactly the object identified in the chart or alternatively if it is wrong then that line can be deleted, and a new bearing measurement can be taken as required.

Figure 6:
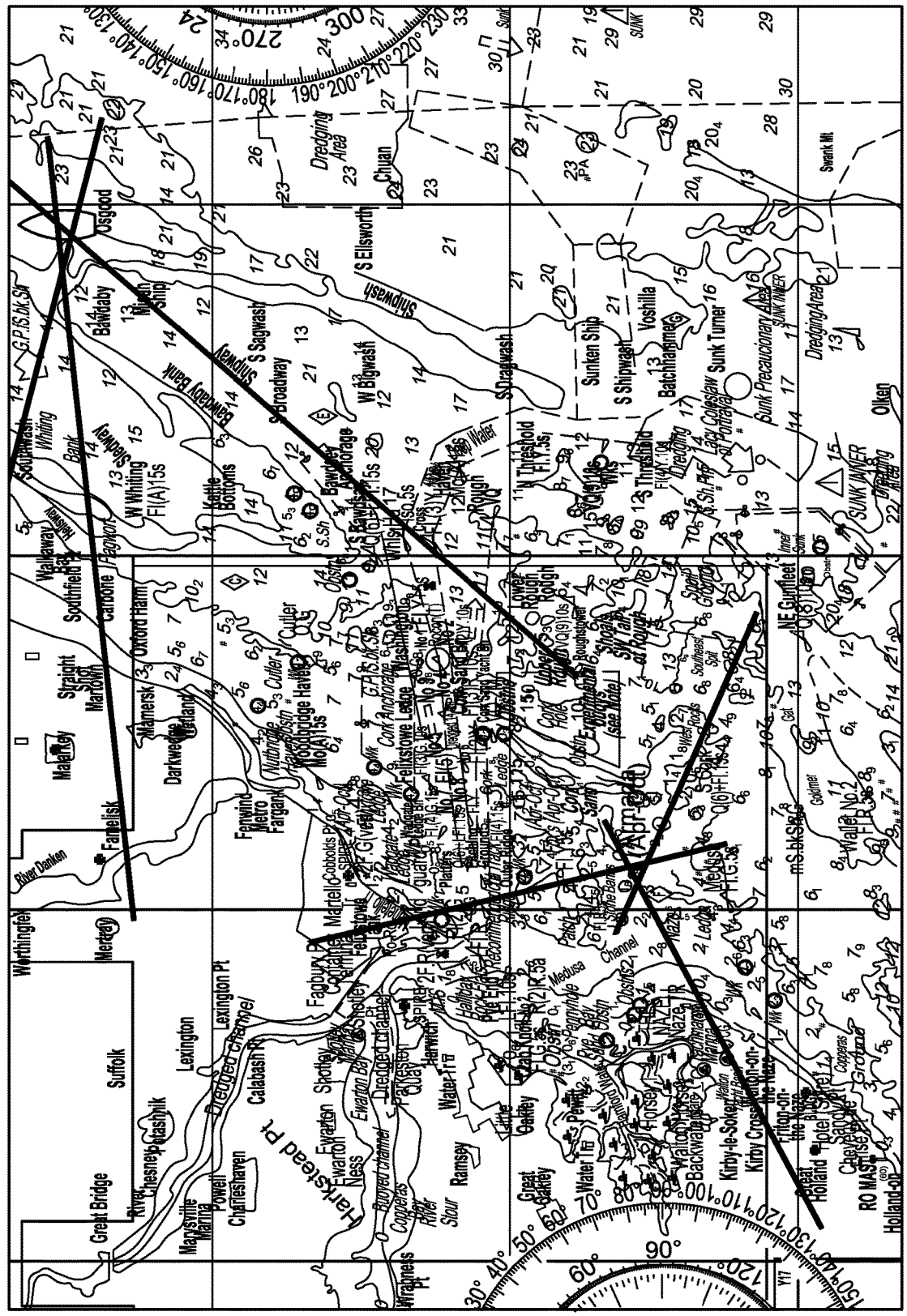
FIG. 6 is a representation of an electronic navigation chart where two positions of a vehicle (vessel) are determined according to an embodiment of the present invention.

The system allows a course of the vehicle and other relevant information to be determined by tracking the positions marked as shown for example in FIG. 6.

Figure 7:
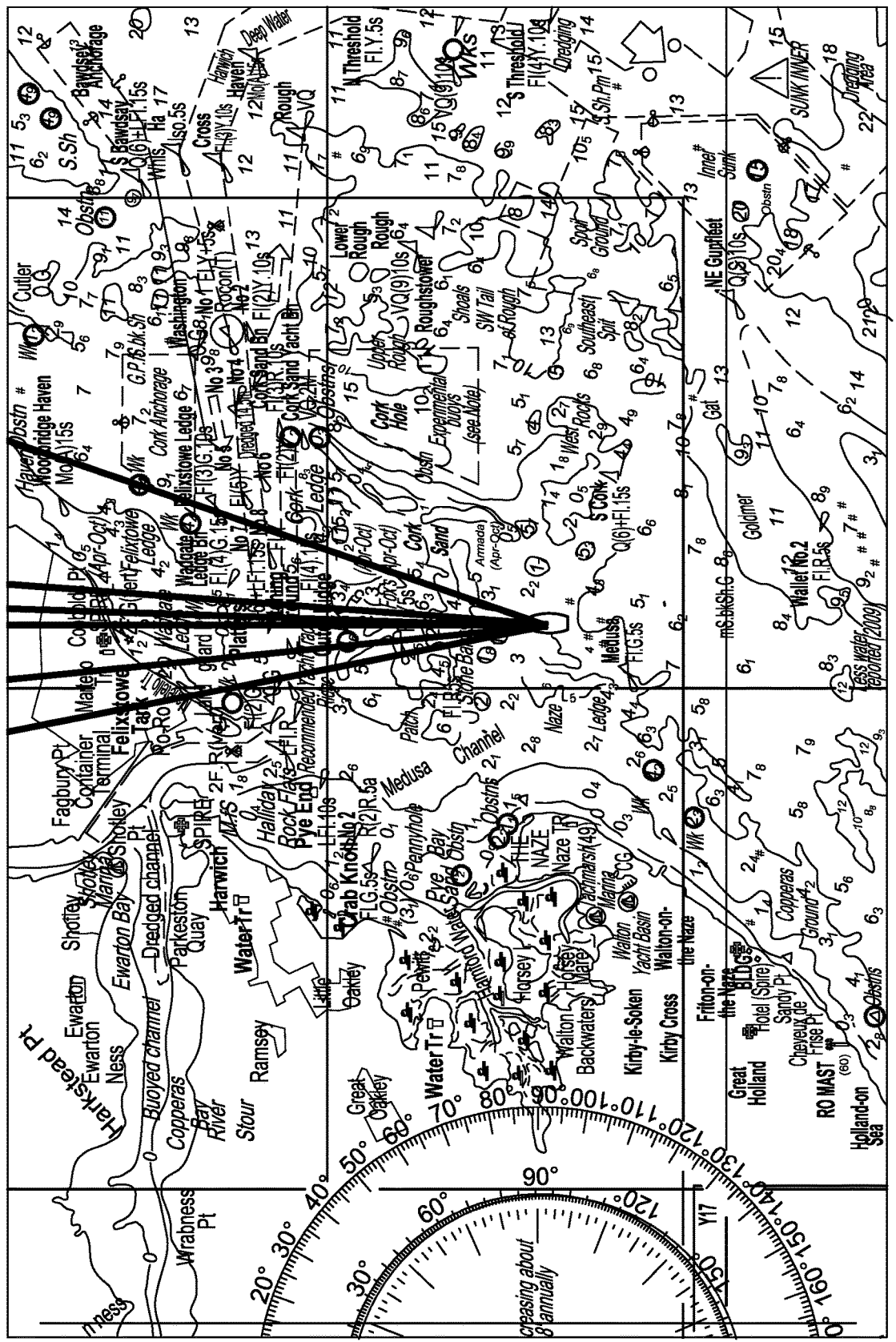
FIG. 7 is a representation of an electronic navigation chart where the position system is operating on a "radar/live" mode according to an embodiment of the present invention.

The system has also a 'radar' mode which can be selected by pressing a touch pad 12. With this mode the system is designed to help identified chartered targets easily. That is, the current bearing taking from the binocular unit is displayed on the chart as a line and that will help identify where the targets are on the navigational chart (see FIG. 7).

As described above, the reference unit 10 has four touch pads/buttons 12. One pad controls the 'radar' option which is cancelled when the binoculars are placed back 'on-hook'. Another pad only operates 'off-hook' and allows relative bearings to be taken. If the sighting button 22 on the binocular unit is pressed, the relative bearing is shown on the display 11 of the reference unit, but no sighting lines are sent to the charting application. Different features may be associated with the other two touch pads.

It will be understood that any features described in relation to any particular embodiment may be featured in combination with other embodiments.

The invention claimed is:

1. A positioning system for navigation comprising:
a reference unit comprising a first gyroscope being positioned on a vehicle and fixedly aligned to said vehicle, and
a portable optical device, in communication with the reference unit, comprising a second gyroscope to measure bearings to Observed target points relative to the vehicle heading to thereby determine a position of the vehicle,
wherein the first and second gyroscopes are synchronized to each other to avoid drift issues when the optical device is connected to the reference unit.

2. A positioning system as claimed in claim 1, further comprising:
a processor to calculate the position of the vehicle on an electronic navigation chart; and
a display to show the position of the vehicle on the electronic navigation chart.

3. A positioning system as claimed in claim 1, wherein the bearings are automatically displayed on the electronic navigation chart.

4. A positioning system as claimed in claim 1, wherein the bearings are automatically logged.

5. A positioning system as claimed in claim 1, wherein the position of the vehicle is determined by obtaining at least three bearings.

6. A method of taking a bearing of a visually observed target point relative to a vehicle heading, the method comprising:
Using a positioning system with:
a reference unit comprising a first gyroscope being positioned on a vehicle and fixedly aligned to said vehicle, and
a portable optical device, in communication with the reference unit, comprising sensing means a second gyroscope to measure bearings to observed target points relative to the vehicle heading to determine a position of the vehicle,
wherein the first and second gyroscopes are synchronized to each other to avoid drift issues when the optical device is connected to the reference unit,
lining up the target point with the portable optical device;
taking the bearing through a human-machine interface;
automatically processing and displaying the bearing on an electronic navigation chart; and
determining the position of the vehicle, preferably by using a 'cocked-hat' method.

7. A positioning system as claimed in claim 1, wherein the portable optical device is configured to be detachably connectable to the reference unit.

8. A positioning system as claimed in claim 1, wherein the portable optical device is a roaming unit which is in communication with the reference unit by transmitting links including optionally, a radio link.

9. A positioning system as claimed in claim 1, wherein the portable optical device comprises a pair of binoculars.

10. A method as claimed in claim 6, further comprising:
determining and tracking additional information, including course, speed, or distance of the vehicle from the target point.

11. A method as claimed in claim 6, wherein the bearing taking step is initiated by pressing a button switch.

12. A positioning system as claimed in claim 1, wherein the reference unit comprises a display to show at least the beatings and other relevant information.

13. A positioning system as claimed in claim 1, being configured to determine and track several positions of the vehicle such that a course of the vehicle can be determined.

14. A positioning system as claimed in claim 1, wherein the reference unit further comprises a touch interface, optionally having touch pads, for selecting different functionalities.

15. A positioning system as claimed in claim 1, comprising a programming port being fitted on the reference unit for software updates.

16. A positioning system as claimed in claim 1, the system being designed to operate on a 'radar/live' mode by which instantaneous bearings are indicated in real-time.

17. A positioning system as claimed in claim 1, wherein the reference unit is powered by a power supply unit deriving power from the vehicle.

18. A method as claimed in claim 6, further comprising taking more than one bearing.

* * * * *